(12) United States Patent
Tagami

(10) Patent No.: US 6,759,815 B2
(45) Date of Patent: Jul. 6, 2004

(54) COLOR PICTURE TUBE DEVICE IN WHICH YH MISCONVERGENCE IS CORRECTED

(75) Inventor: Etsuji Tagami, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/231,521

(22) Filed: Aug. 30, 2002

(65) Prior Publication Data

US 2003/0057893 A1 Mar. 27, 2003

(30) Foreign Application Priority Data

Sep. 3, 2001 (JP) ........................................ 2001-265773

(51) Int. Cl.[7] ............................ G09G 1/28; H01J 29/70
(52) U.S. Cl. ................................. 315/368.11; 315/370
(58) Field of Search ........................... 315/368.11, 370, 315/368, 400, 13 C, 368.28, 368.25, 402, 399, 364; 313/440, 412, 413, 431, 442, 421, 428

(56) References Cited

U.S. PATENT DOCUMENTS

| | | | | |
|---|---|---|---|---|
| 3,840,771 A | * | 10/1974 | Morio et al. ........... | 315/368.18 |
| 4,588,930 A | * | 5/1986 | Kobayashi et al. ......... | 315/400 |
| 6,215,257 B1 | * | 4/2001 | Choe ..................... | 315/368.28 |
| 6,326,742 B1 | * | 12/2001 | Iwasaki et al. ............. | 315/370 |
| 6,359,397 B1 | * | 3/2002 | Aoki ..................... | 315/368.11 |
| 6,492,783 B2 | * | 12/2002 | Sakurai et al. ......... | 315/368.28 |
| 6,501,238 B1 | * | 12/2002 | Lim et al. ................... | 315/402 |

* cited by examiner

Primary Examiner—Wilson Lee
Assistant Examiner—Chuc Tran

(57) ABSTRACT

A group of an upper coma correction coil and an upper four-pole coil is positioned in opposition to a group of a lower coma correction coil and a lower four-pole coil, with respect to an electron beam. A first circuit is composed of a circuit in which the lower four-pole coil and a first diode are connected in series is connected in parallel to the upper coma correction coil. A second circuit is composed of a circuit in which the upper four-pole coil and a second diode are connected in series is connected in parallel to the lower coma correction coil. The first circuit and the second circuit connected in series compose a YH correction circuit. The first diode and the second diode are positioned so as to have opposite polarities. Vertical deflection current is diverted to the YH correction circuit.

5 Claims, 20 Drawing Sheets

FIG.12
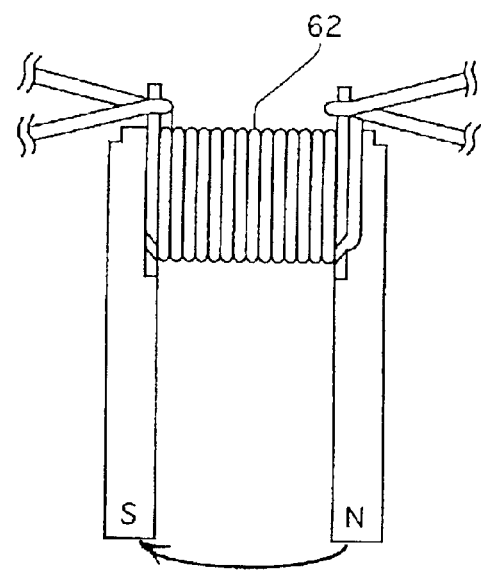
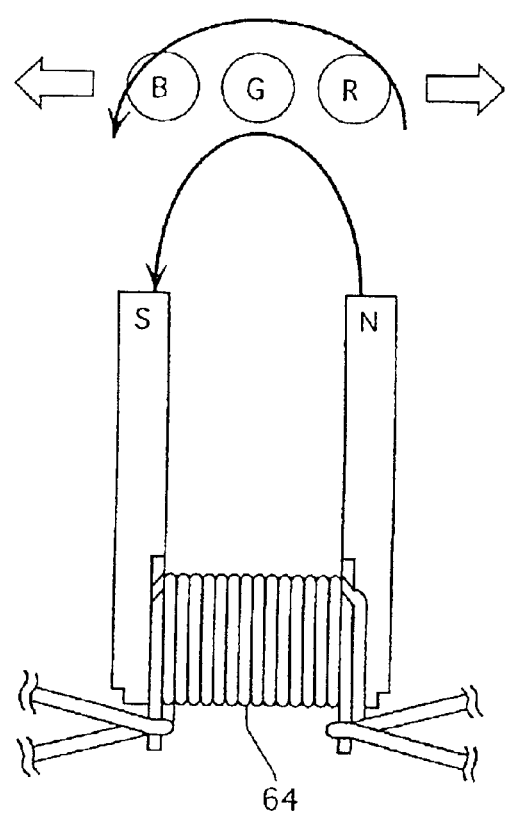

FIG.13
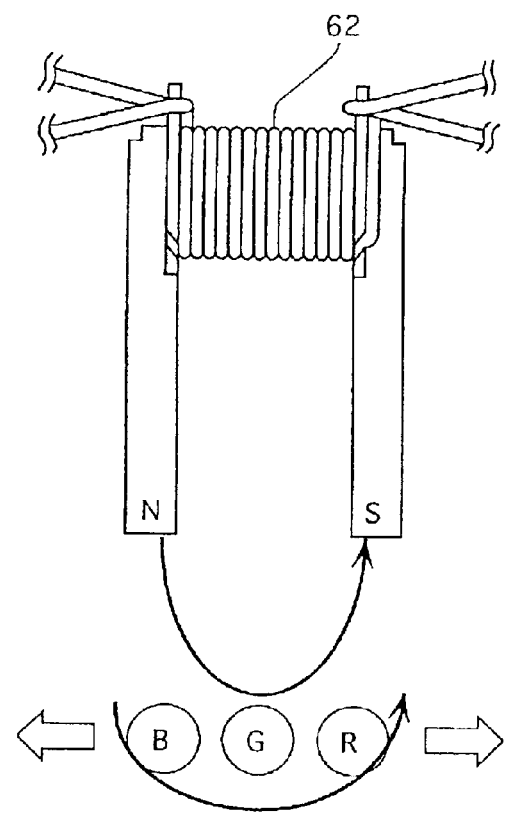
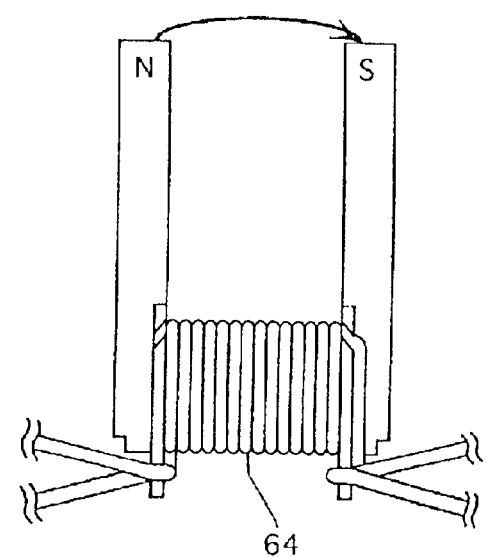

COLOR PICTURE TUBE DEVICE IN WHICH YH MISCONVERGENCE IS CORRECTED

BACKGROUND OF THE INVENTION (1) Field of the Invention

The present invention relates to a color picture tube device that is used in a television, a computer display or the like, and in particular to a technique for correcting YH misconvergence in the color picture tube device.

(2) Related Art

Generally in a color picture tube a magnet is provided at each of the top and bottom (hereinafter top/bottom magnets) at the front of a deflection yoke to correct upper and lower pincushion raster distortion (hereinafter simply referred to as "raster distortion"). However, a side effect of correcting raster distortion with top/bottom magnets is the occurrence of YH misconvergence. FIG. 1 illustrates YH misconvergence.

In FIG. 1, an electron beam R (red) and an electron beam B (blue) should be irradiated in the center of the screen in a horizontal direction, but instead diverge in the horizontal direction the closer they become to the upper and lower edges of the screen in the vertical direction. The cause of this divergence in the horizontal direction is the vertical direction component of the electric fields generated by the top/bottom magnets.

Japanese patent number 2667215 discloses one example of a technique for correcting YH misconvergence in a color picture tube device. This color picture tube has four-pole coils on the electron gun side of the deflection yoke, and corrects YH misconvergence by supplying a vertical deflection current to a YH misconvergence correction circuit (hereinafter "YH correction circuit") that includes the four-pole coils.

FIG. 2 shows the structure of the YH correction circuit. In FIG. 2, a YH correction circuit 140 is composed of a circuit that is composed of a four-pole coil 141 that is connected in serial to a circuit in which a diode 143 and a resistor 142 that are connected in parallel, and that is connected in parallel with a circuit having the same structure in which a diode 145 is connected in the opposite direction to the diode 143. The circuits are connected to a vertical deflection coil by a terminal 147.

However, while the amount that YH misconvergence is corrected (hereinafter "YH correction amount") by the YH correction circuit 140 increases linearly in proportion to the size (absolute value) of vertical deflection current, the amount of YH misconvergence increases in a parabola shape the closer it becomes to the edge portions in the vertical direction.

For this reason, when misconvergence in the horizontal direction at the edge portions is resolved using the YH correction circuit 140, the YH correction amount is excessive in the area between each edge portion in the vertical direction and the center of the screen, causing residual misconvergence. FIG. 3 shows misconvergence (hereinafter "YH winding") that remains after correcting YH misconvergence using the YH correction circuit 140. Here, R and B diverge in the area between either edge portion in the vertical direction and the center of the screen due to over-correction.

To solve this problem, Japanese laid open patent application number 4-298942 discloses a convergence correction device which combines diodes in multi-stages and varies the YH correction amount in accordance with the size of the vertical deflection current, to reduce YH winding. FIG. 4 shows the circuit structure of the disclosed convergence correction device. In FIG. 4, a resistor 153 is connected in series to a circuit in which a diode 152 and a resistor 155 are connected in parallel.

A circuit 151 composed of a plurality of diodes connected in series is connected to a circuit composed of the diode 152 and resistors 153 and 155 in parallel. Furthermore, a coil 154 is connected in series to the circuit. Another circuit that has the same structure as the circuit that includes the coil 154 and whose diodes are arranged in the opposite direction to those in the circuit 151 are connected in parallel to the circuit that includes the coil 154. Together these circuits compose a YH correction circuit 150.

In the YH correction coil 150, diodes connected in tandem switch to vary the amount of vertical deflection current, thus varying the amount of current that passes through the coil. Such a construction reduces residual YH winding by varying in stages the rate at which the YH correction amount increases, in response to increases in the amount of current.

However, in recent years rapid advances in color picture tubes have lead to flattening of panels and wider deflection angles, with a purpose of reducing the length of the picture tube. As a result, stronger top/bottom magnets are being used to correct raster distortion that has worsened compared to prior art. For these reasons YH misconvergence is becoming markedly worse.

Furthermore, for the same reasons, the high order components of YH misconvergence has increased and YH misconvergence bends to a much greater degree. Consequently, YH winding cannot be improved sufficiently using conventional techniques.

SUMMARY OF THE INVENTION

In order to solve the above-described problems, the object of the present invention is to provide a color picture tube device capable of accurately correcting YH misconvergence, even when YH misconvergence worsens markedly.

In order to achieve the aforementioned objective, the color picture tube of the present invention is a color picture tube composed of an electron gun that includes three inline cathodes, including: a set of YH misconvergence correction coils; and a set of coma aberration correction coils that generates a magnetic field to correct YH misconvergence, by different amounts of currents being supplied to each coil that composes the set of coma aberration correction coils, according to an amount of vertical deflection current.

According to the stated construction, YH misconvergence can be corrected accurately and residual YH winding that occurs after correcting YH misconvergence can be controlled, regardless of the degree of YH misconvergence.

In addition, the coma correction coil, which is a necessary compositional element of a color picture tube, is used in YH misconvergence correction. Therefore, YH misconvergence can be corrected with fewer components and a simpler circuit structure than conventional techniques, and without the addition of special components.

Furthermore, it is desirable that a pair of cores is provided, the cores being arranged on opposing sides of electron beams emitted from the electron gun, the YH misconvergence correction coils are respectively wound around the cores, the coma aberration correction coils are respectively wound around the cores, and vertical deflection current is diverted to the set of YH misconvergence correction coils and the set of coma aberration correction coils.

According to the stated construction, the coma correction coil and the four-pole coil share the cores. Therefore, the components in the color picture tube can be reduced in number and mounted with greater accuracy. An example of the cores is U-shaped cores, the U-shaped cores being positioned respectively above and below the electron beams in opposition to each other so that legs of one U-shaped core face legs of the other U-shaped core. A further example of the cores is E-shaped cores, the E-shaped cores being positioned respectively on left and right sides of the electron beams in opposition to each other so that legs of one E-shaped core face legs of the other E-shaped core.

Describing the present invention in terms of circuit structure, the present invention may be described as, as shown in FIG. 9, a color picture tube composed of an electron gun that includes three inline cathodes, including: an upper YH misconvergence correction coil; a lower YH misconvergence correction coil that is provided in opposition to the upper YH misconvergence correction coil with regard to electron beams emitted from the electron gun; an upper coma aberration correction coil that is provided on the same side as the upper YH misconvergence correction coil with regard to the electron beam; a lower coma aberration correction coil that is provided in a position that opposes the upper coma aberration correction coil with regard to the electron beams; a first switching element that is connected to a circuit so as to conduct when the electron beams scan an upper side of a screen; a second switching element that is connected to a circuit so as to conduct when the electron beams scan an lower side of the screen; a YH misconvergence correction circuit composed of (1) a first circuit in which a circuit composed of the lower YH misconvergence correction coil and the first switching element connected in series is connected in parallel to the upper coma aberration correction coil, and (2) a second circuit in which a circuit composed of the upper YH misconvergence correction coil and the second switching element are connected in series is connected in parallel to the lower coma aberration correction coil, the first circuit and the second circuit being connected in series, wherein vertical deflection current is diverted to the YH misconvergence correction circuit.

According to the stated construction, YH winding can be controlled and YH misconvergence can be corrected using a simple circuit structure, without having to provide a complicated circuit structure. Note that the first switching element and the second switching element may be diodes.

Furthermore, in terms of technical significance, the present invention is a color picture tube composed of an electron gun that includes three inline cathodes, including: a first circuit that has a four-pole magnetic field generated by diverting vertical deflection current to a pair of coils that are positioned in opposition to each other with regard to electron beams emitted by the electron gun; and a second circuit that has a four-pole magnetic field generated by diverting vertical deflection current to a pair of coils that are positioned in opposition to each other with regard to the electron beams, the four pole-magnetic field generated by the second circuit having the same polarity as the four-pole magnetic field generated by the first circuit.

According to the stated structure, the high order components of YH misconvergence can be dealt with while achieving a sufficient amount of correction.

Describing the technical significance in terms of circuit structure, the present invention is a color picture tube composed of an electron gun that that three inline cathodes, including: a first circuit that is composed of (1) a circuit in which a first coil and a first diode are connected in series connected in parallel to (2) a circuit in which a second coil that is positioned in opposition to the first coil with regard to electron beams emitted by an electron gun is connected in series to a second diode, the first diode and the second diode conducting in mutually opposite directions; a second circuit that is connected in series to the first circuit, and is composed of (3) a circuit in which a third coil and a third diode are connected in series connected in parallel to (4) a circuit in which a fourth coil that is positioned in opposition to the third coil with regard to the electron beams is connected in series to a fourth diode, the third diode and the fourth diode conducting in mutually opposite directions, wherein vertical deflection current is diverted to the first circuit and the second circuit.

In particular, taking the high order components of YH misconvergence into account, it is preferable that a circuit composed of a plurality of diodes that conduct in the same conduction direction as the first diode and that are connected in series is connected in parallel to the first diode, and a circuit composed of a plurality of diodes that conduct in the same conduction direction as the second diode and that are connected in series is connected in parallel to the second diode, the number of the plurality of diodes that conduct in the same direction as the second diode being equal to the number of the plurality of diodes that conduct in the same direction as the first diode. Furthermore, the present invention is a color picture tube composed of an electron gun that includes three inline cathodes, including: an upper coma aberration correction coil; a lower coma aberration correction coil that is positioned in opposition to the upper coma aberration correction coil with respect to electron beams emitted by the electron gun; a first switching element that is positioned so as to conduct when an upper side of a screen is being scanned; a second switching element that is positioned so as to conduct when a lower side of the screen is being scanned; and a YH misconvergence correction circuit composed of (1) a first circuit in which the first switching element and the upper coma aberration correction coil are connected in parallel, and (2) a second circuit in which the second switching element and the lower coma aberration correction coil are connected in parallel, the first circuit and the second circuit being connected in series, wherein vertical deflection current is diverted to the YH misconvergence correction circuit.

According to the stated construction, YH misconvergence can be corrected with use of the coma aberration correction circuit.

The present invention, based on the above-described technical ideas, is able to correct YH misconvergence accurately and at a low cost, even when YH misconvergence worsens markedly.

BRIEF DESCRIPTION OF THE DRAWINGS

These and other objects, advantages and features of the invention will become apparent from the description thereof taken in conjunction with the accompanying drawings that illustrate a specific embodiment of the invention.

In the drawings:

FIG. 12 shows the magnetic fields that the coma correction coils generate when the electron beams are deflected upwards, and in particular when the vertical deflection current exceeds a predetermined value;

FIG. 13 shows the magnetic fields that the coma correction coils generate when the electron beams are deflected downwards, and in particular when the vertical deflection current exceeds a predetermined value;

DESCRIPTION OF THE PREFERRED EMBODIMENTS

The following describes an embodiment of the present invention with reference to the drawings.

<Structure of the Color Picture Tube Device>

Figure 5:
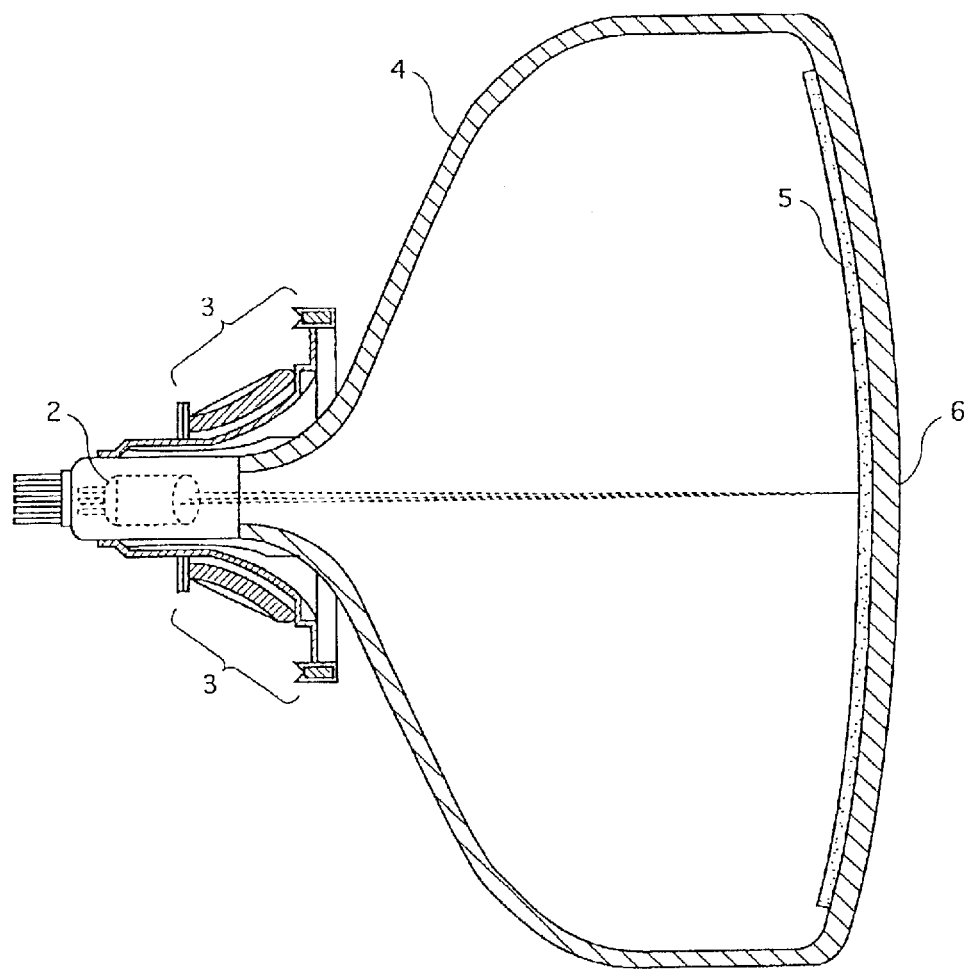
FIG. 5 is a cross-sectional view showing the color picture tube of an embodiment of the present invention, cut vertically so as to include the tube axis.

FIG. 5 is a cross sectional view of the color picture tube device of the present embodiment, cut vertically so as to include the tube axis. In FIG. 5, a funnel portion 4 of a glass bulb of a color picture tube device 1 is surrounded by a deflection yoke 3 at an electron gun 2 side. Electron beams emitted from the electron gun 2 are deflected by the deflection yoke 3 to be irradiated on a phosphor layer that has been applied to the inner side of the screen surface 6 at the front of a panel portion of the glass valve. This causes the phosphor layer 5 to emit light, thus showing video on the screen surface 6.

Note that color picture tube device 1 is a flat panel color picture tube that has a 76 cm (32 inch) screen. The overall deflection angle (the maximum deflection angle in a diagonal direction) is 120°, and the aspect ratio of the color picture tube is 16:9. The electron gun 2 is an inline electron gun that has three inline cathodes, each of which emits an electron beam corresponding to R, G, and B respectively.

Figure 6:
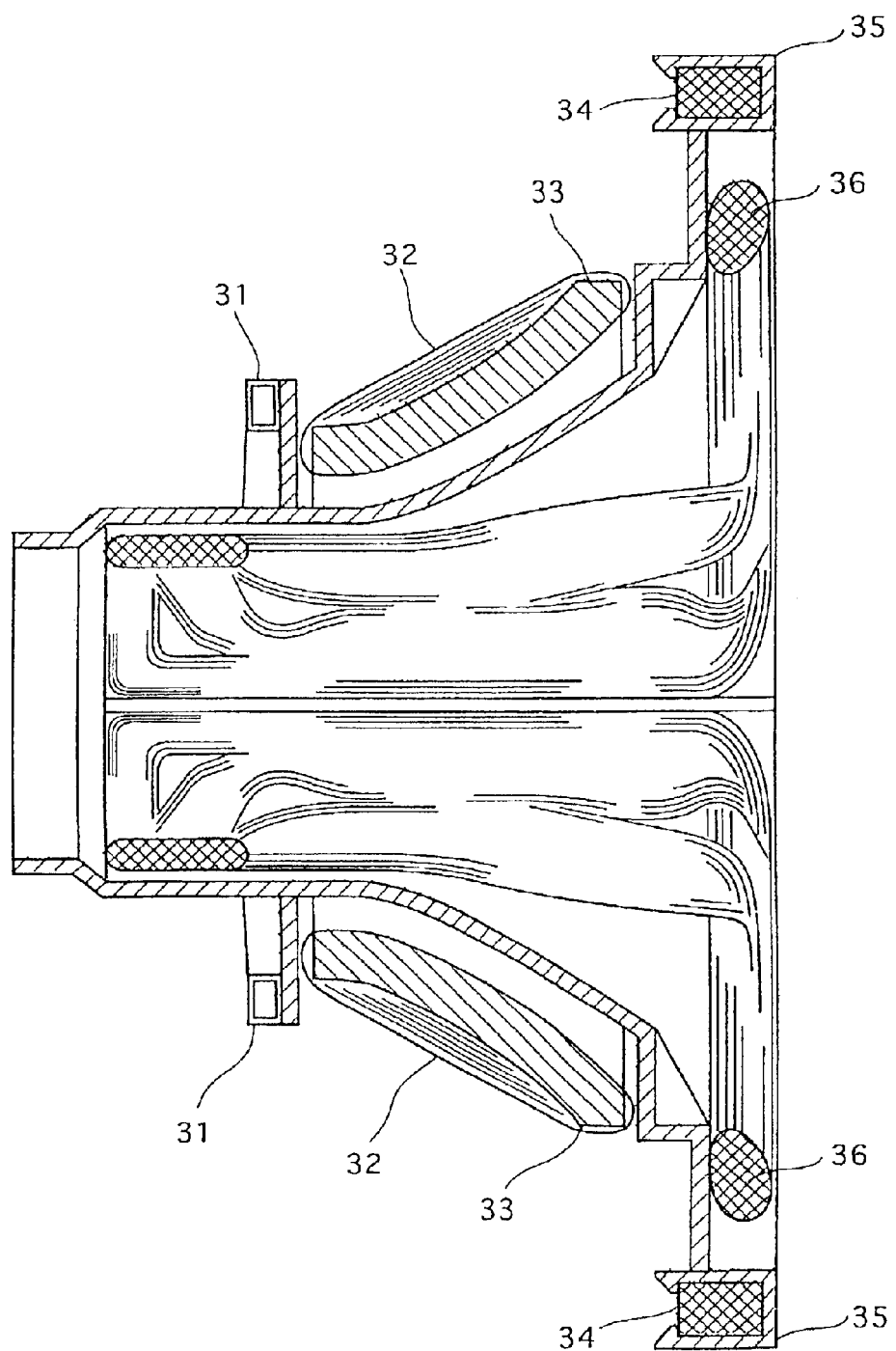
FIG. 6 is a cross-sectional view of the deflection yoke in the color picture tube apparatus in the present embodiment, cut vertically so as to include the tube axis.

FIG. 6 is a cross-sectional view of the deflection yoke 3 in the color picture tube apparatus 1, cut vertically so as to include the tube axis. The deflection yoke 3 includes opposing vertical deflection coils 36 that generate a vertical deflection magnetic field, and opposing horizontal deflection coils 33 that generate a horizontal deflection magnetic field. The deflection coils 33 and 36 are supported respectively by a support frame 35.

A ferrite core 32 in the deflection yoke 3 improves the efficiency of the deflection magnetic fields generated by the deflection coils 33 and 36. Top/bottom magnets 34 are fixed at the top and bottom at the front of the support frame 35 to correct raster distortion. Opposing correction coils 31, such as those described below, are provided at the top and bottom of the electron gun 2 end of the deflection yoke 3.

<Structure of the Correction Coils>

Figure 7:
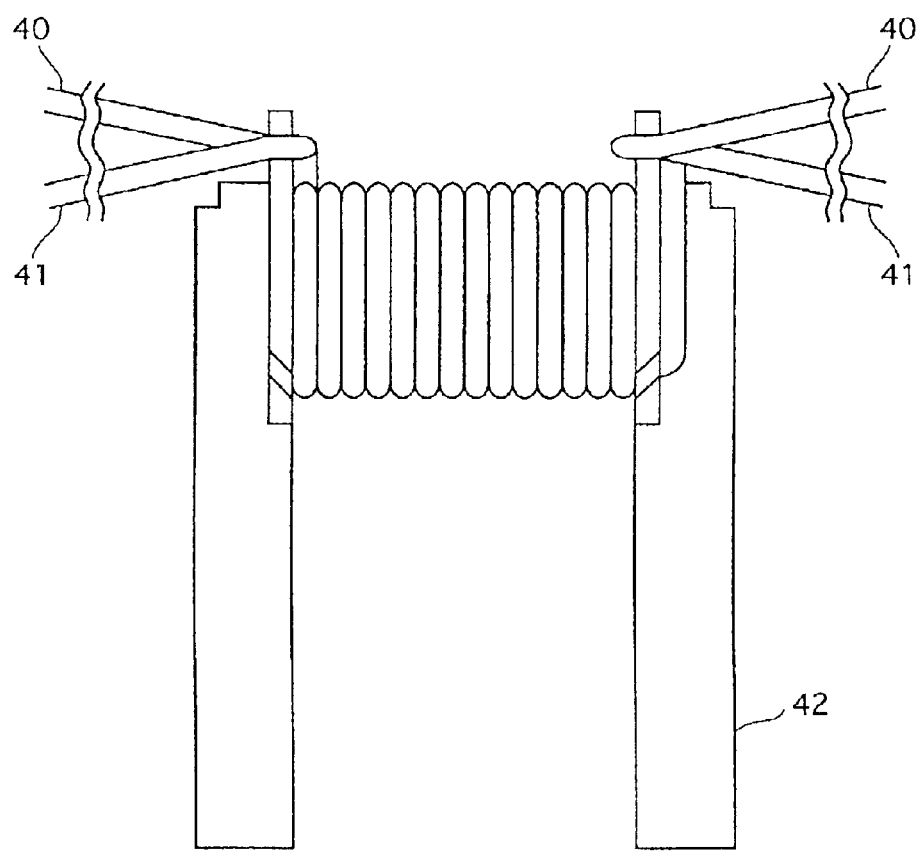
FIG. 7 shows the construction of one of an opposing pair of correction coils that are provided above and below electron beams.

FIG. 7 shows only one of the opposing correction coils 31 that are provided above and below the electron beams. The main component of the correction coil 31 is a coma aberration correction coil (hereinafter "coma correction coil") 40 that corrects vertical coma aberration. The correction coil 31 is further composed of a four-pole coil 41 that generates a four-pole magnetic field for correcting YH misconvergence.

The coma correction coil 40 and the four-pole coil 41 are wound around a U-shaped core 42 at a turns ratio of seven turns of the four-pole coil 40 to ten turns of the coma correction coil 41. Note that hereinafter the side that is above the electron beam in the vertical direction (N side), as seen from the screen surface 6 side, is referred to as the "upper side", while the side that is below the electron beam in the vertical direction (S side), as seen from the screen surface 6 side, is referred to as the "lower side".

Figure 8:
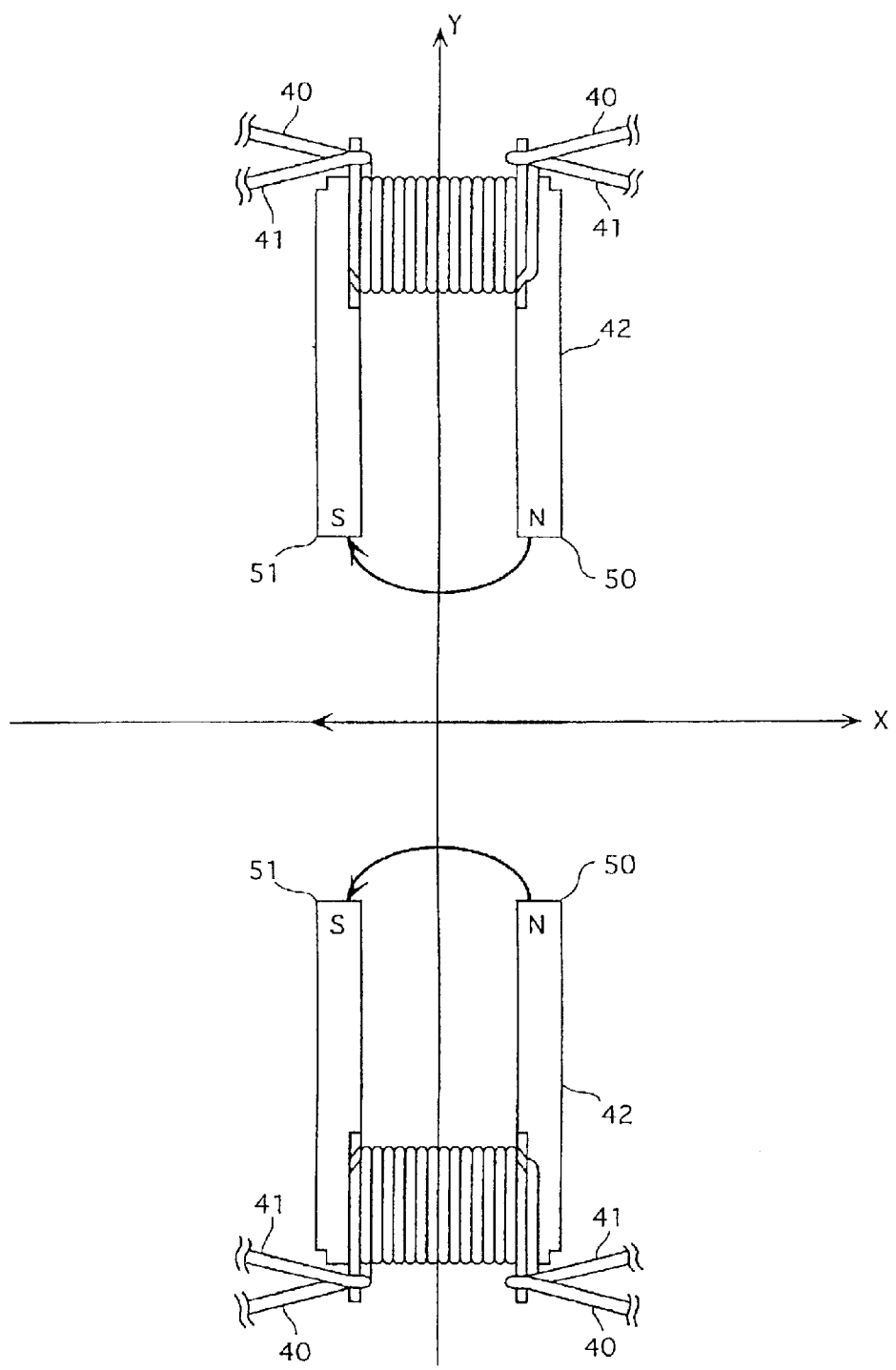
FIG. 8 shows magnetic fields that the coma correction coils generate when the electron beams are deflected upwards.

FIG. 8 shows the electric fields that the coma correction coils 40 generate when the vertical deflection coil 36 has the electron beams deflected towards the upper side ("upwards"). Here, the coma correction coils 40 are seen from the screen side. As FIG. 8 shows, when the electron beams are deflected upwards, the end 50 of the right side (E side) of each of the U-shaped cores 42 in the horizontal direction is a north pole, and end 51 of the left side (W side) of each of the U-shaped cores 42 in the horizontal direction is a south pole. The U-shaped cores 42 correct coma aberration by generating an electric field from right to left in the horizontal direction.

In other words, when the electron beams are deflected upwards, the electron beam G, which is the center of the three electron beams R, G and B, is deflected more, while R and B electron beams are deflected less. Similarly, when the electron beams are deflected towards the lower side ("downwards"), the electron beam G is deflected more, while the electron beams R and B are deflected less. In this way, coma aberration in the vertical direction is corrected, in other words, the electron beams R and B being deflected more than the electron beam G in the vertical direction is corrected.

<Structure of the YH Correction Circuit>

Figure 9:
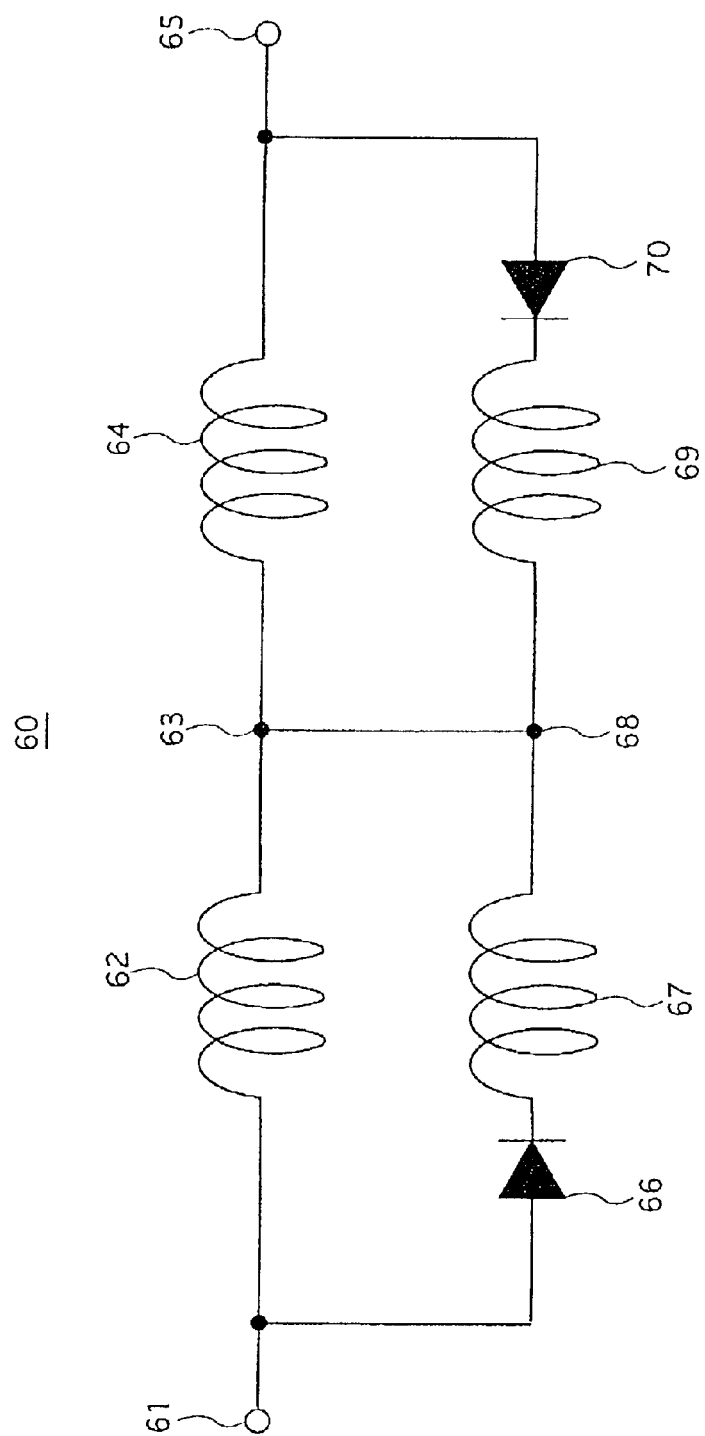
FIG. 9 shows the construction of a YH correction circuit composed of coma correction coils, four-pole coils and diodes.

FIG. 9 is a circuit diagram showing the structure of the YH correction circuit in the present embodiment.

In FIG. 9, a YH correction circuit 60 is composed of diodes 66 and 70, a lower four-pole coil 67 and an upper four-pole coil 69. These elements are connected in series in order of the diode 66, the lower four-pole coil 67, the upper four-pole coil 69 and the diode 70, to form a series circuit.

The YH correction coil 60 is further composed of another series circuit that is composed of an upper coma correction coil 62 and a lower coma correction coil 64 connected in series. The two series circuits are connected in parallel to compose as a whole a parallel circuit, and are further connected by a bridge connection at connection points 63 and 68, to form the YH correction circuit 60.

Considering the YH correction circuit 60 from a different point of view, the YH correction circuit 60 is composed of (1) a circuit in which the upper coma correction coil 62 is connected in parallel with a circuit composed of the diode 66 and the four-pole coil 67 connected in serial, and (2) a circuit in which the lower coma correction coil 64 is connected in parallel with a circuit in which the upper four-pole coil 69 and the diode 70 are connected in serial. The two parallel circuits are connected to each other in serial to form the YH correction circuit 60.

Note that the connection point 63 is at an intermediate position between the upper coma correction coil 62 and the lower coma correction coil 64, and the connection point 68 is at an intermediate position between the lower four-pole coil 67 and the upper four-pole coil 69. The diodes 66 and 70 are Schottky diodes. The diode 66 conducts when the electron beams are deflected upwards, and the diode 70 conducts when the electron beams are deflected downwards.

Note that as described earlier, the degree of YH misconvergence differs according to the size of the screen, overall deflection angle, aspect ratio, and so on. Consequently, the turns ratio of the four-pole coil and the coma correction coil is not limited to the aforementioned ratio of 7:10. It is desirable to choose an appropriate ratio for the degree of YH misconvergence to be corrected.

The YH correction circuit 60 having the described structure has the coma correction coils 62 and 64 and the four-pole coils 67 and 69 generate YH correction magnetic fields, by having vertical deflection current diverted from the terminal 61 or the terminal 65. Simultaneous to this, the YH correction circuit 60 has the coma correction coils 62 and 64 generate coma aberration correction magnetic fields.

In the present embodiment, current flows from the terminal 61 to the terminal 65 when the electron beams are deflected upwards, and from the terminal 65 to the terminal 61 when the electron beams are deflected downwards.

<Operations of the YH Correction Circuit>

The following describes the operations of the YH correction circuit 60. When the vertical deflection angle is zero, the amount of vertical deflection current is zero, and the amount of current increases as the vertical deflection angle moves away from 0°. In sync with this, the current supplied to the YH correction circuit 60 is zero when the vertical deflection angle is zero, and increases as the vertical deflection angle moves away from 0°.

Figure 10:
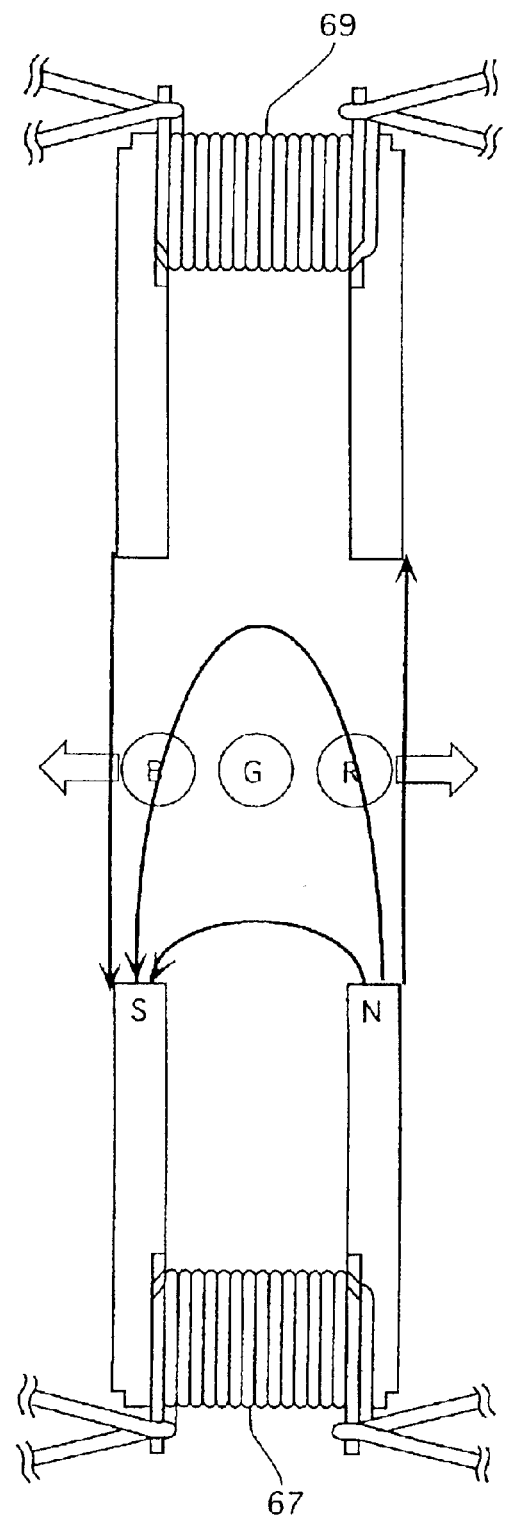
FIG. 10 shows magnetic fields that the four-pole coils generate when the electron beams are deflected upwards.

When the electron beams scan the upper side of the screen, current is supplied to the lower four-pole coil 67 according to rectification effects by the diodes 66 and 70, and is not supplied to the upper four-pole coil 69. This results in generation of four-pole magnetic fields such as those shown in FIG. 10. FIG. 10 shows the four-pole magnetic fields that the four-pole coils 67 and 69 generate when the electron beams are deflected upwards. The four-pole magnetic fields effect the electron beams R and B so that the respective intervals between the electron beams R and B and the electron beam G widen in the horizontal direction. This corrects YH misconvergence.

Furthermore, while the electron beam G does is not affected in the horizontal direction by the four-pole magnetic field, it is affected slightly upwards in the vertical direction. By effecting the electron beam G in this way, the four-pole coils 67 and 69 assist in correcting coma aberration when the electron beams are deflected upwards.

Figure 11:
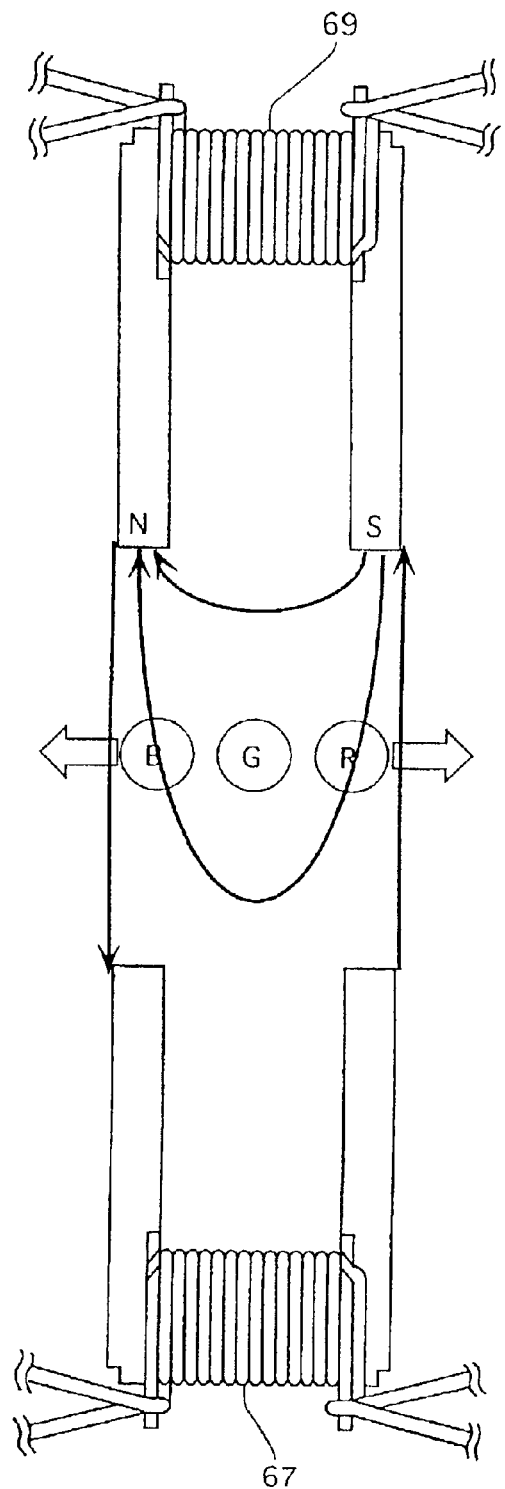
FIG. 11 shows magnetic fields that the four-pole coils generate when the electron beams are deflected downwards.

When the electron beams scan the lower side of the screen, the four-pole coils generate four-pole magnetic fields such as those shown in FIG. 11, and correct YH misconvergence by widening the respective intervals between the electron beams R and B and the electron beam G in the horizontal direction. The size of the current supplied to the four-pole coils 67 as 69 increases as the vertical deflection angle increases, to correct greater YH misconvergence. There is no vertical deflection current when the vertical deflection angle is zero, therefore YH correction magnetic fields are not generated.

Note that when the electron beams are deflected downwards, the electron beam G is not affected in the horizontal direction, but is affected slightly downwards in the vertical direction. Consequently, the four-pole coils 67 and 69 have an effect of assisting correction of coma aberration even when the electron beams are deflected downwards.

The following describes the operations of the coma correction coils 62 and 64. When the vertical deflection current in the YH correction circuit is small, the current supplied to each of the coma correction coils is substantially equal, and coma correction magnetic fields such as those shown in FIG. 8 are generated. When the vertical deflection current exceeds a predetermined value, the diode 66 or the diode 70 switches to divert vertical deflection current to the four-pole coil 67 or the four-pole coil 69.

For example, in the case of the electron beams being deflected upwards, when the vertical deflection current exceeds the predetermined value, part of vertical current that is supplied to the upper coma coil 62 is supplied to the four-pole coil 67 via the diode 66. Here, since the diode has reverse-polarity, it does not have a rectifying effect, and therefore current is not supplied to the upper four-pole coil 69. Consequently, all of the vertical deflection current is supplied to the lower coma correction coil 64, and then flows out of the terminal 65.

As a result, the current that is supplied to the lower coma correction coil 64 is greater than the current that is supplied to the upper coma correction coil 62, therefore the magnetic fields generated by the coma correction coils 62 and 64 are unbalanced. This also corrects YH misconvergence. FIG. 12 shows the unbalanced magnetic fields generated by the coma correction coils 62 and 64 (when the electron beams are deflected upwards).

The magnetic fields have components in the positions of both the electron beams R and B in the upper and lower directions. The electron beams R and B are affected by the components so that the respective intervals between the electron beams R and B and the electron beam G widen in the horizontal direction, thus correcting YH misconvergence. Furthermore, the magnetic fields do not have components in the upper and lower directions in the position of the electron beam G, but have only a component in the horizontal direction. Therefore, the electron beam G receives an upward effect, thus correcting coma aberration.

FIG. 13 shows the magnetic fields generated by the coma correction coils 62 and 64 when the electron beams are deflected downwards. The direction of the current is opposite to when the electron beams are deflected upwards, and the amount of current supplied to the lower coma correction coil 64 decreases. Therefore, magnetic fields are generated as shown in the drawing, thus correcting YH misconvergence, and simultaneously correcting coma aberration.

Figure 14:
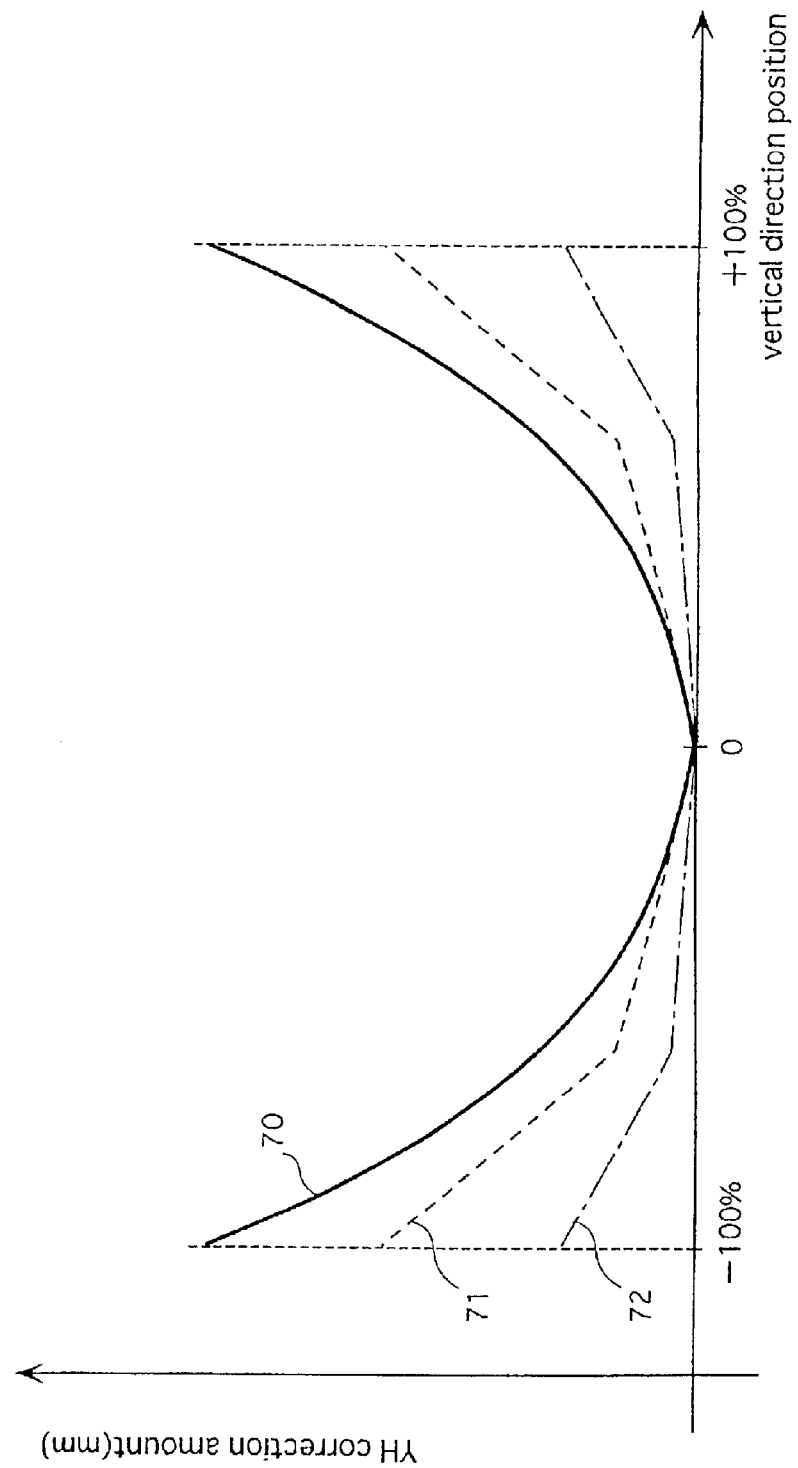
FIG. 14 is a graph showing the relationship between target values of YH correction amount of the coma correction coils and the four-pole coils respectively, and the vertical direction position on the screen.

The YH correction circuit 60 corrects YH misconvergence according to the effects of a magnetic field in which the magnetic fields generated by the four-pole coils 67 and 69 and the magnetic field generated by the coma correction coils 62 and 64 are superposed. FIG. 14 is a graph showing the relationship between the amount of YH correction according to the effects of the magnetic fields, and the position in the vertical direction on the screen. In FIG. 14, a solid line 70 represents the amount of correction necessary to correct YH misconvergence, in other words, target values.

Furthermore, a line 72 broken with dots represents the amount of YH correction by the coma correction coils 62 and 64, while a dashed line 71 represents the amount of YH correction by the four-pole correction coils 67 and 69. The total value of each amount of YH correction by the coma correction coils 62 and 64 and the four-pole correction coils 67 and 69 is the amount of YH correction by the correction coil 31 of the present embodiment. Note that in FIG. 14 the amounts of correction are shown in millimeter units. The amount of YH misconvergence was evaluated for each position in the vertical direction according to the length of the misconvergence in the horizontal direction. Furthermore, 100% in the vertical direction denotes a scanning position when the electron beams are deflected at the greatest angle on the upper side of the screen, while –100% in the vertical direction denotes a scanning position when the electron beams are deflected at the greatest angle on the lower side of the screen.

The curved line 70 is drawn in a symmetrical parabola-shape in relation to the vertical direction position 0% for the target value of YH correction in accordance with YH misconvergence characteristics. As the vertical deflection current in the four-pole coils 67 and 69 increases, the amount of YH correction also increases. Furthermore, when the amount of vertical deflection current exceeds a predetermined value, the current in one of the coma correction coils becomes saturated. Therefore as the amount of vertical deflection current flowing after saturation increases, the difference between the amount of current flowing through the two coma correction coils increases, thus increasing the YH correction amount.

Consequently, the manner in which the YH correction amount increases changes greatly as the vertical deflection current amount increases before and after the vertical deflection current exceeds the predetermined value. As a result, the total of the amount of YH correction by the four-pole coils 67 and 69 and amount of YH correction by the coma correction coils 62 and 64 makes a curved line in accordance with the YH correction amount target values. Therefore, YH misconvergence is corrected accurately, and YH winding is reduced.

The following evaluates the differences between the present invention and prior art. In the misconvergence correction device in the aforementioned Japanese laid open patent application number 4-298942, it is necessary to control switching of the diodes as well as to increase the resistance value, in order to increase the YH correction amount. However, this change increases the amount of current when the diode switches, resulting in the graph of the YH correction value moving away from the parabola shape that is the target, and coming close to being a straight line. This worsens YH winding.

In contrast, in the YH correction circuit 60 of the present invention, the further the vertical deflection position is from 0%, the more the coma correction coils 62 and 64 exert YH correction. Therefore a correction amount that is even closer to the target value can be achieved, and YH winding can be avoided.

Figure 15:
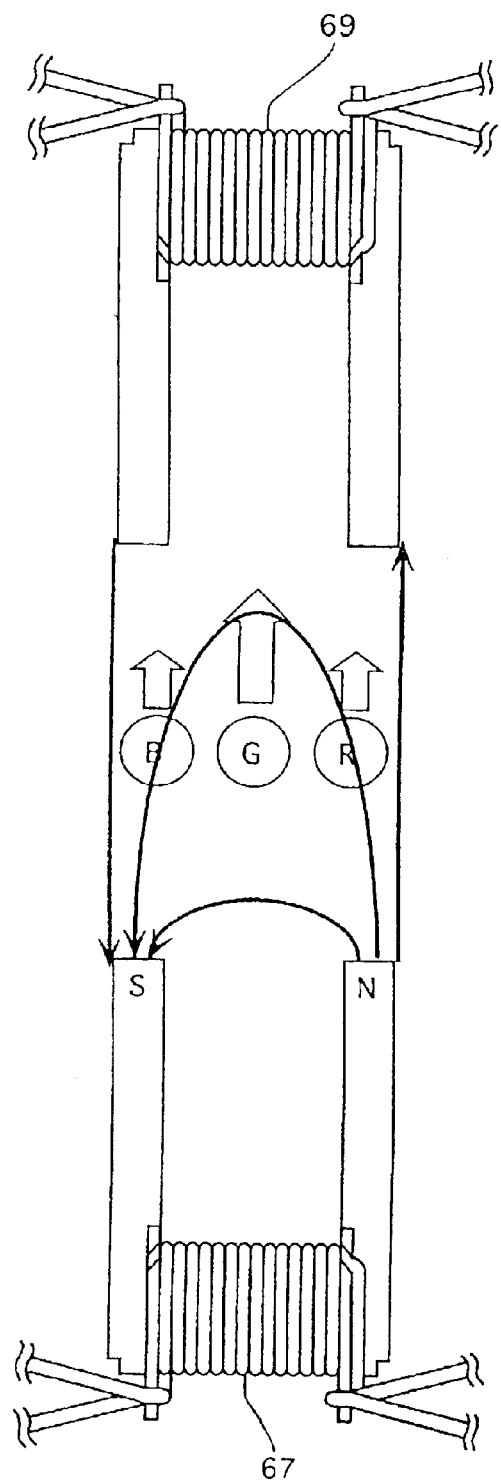
FIG. 15 shows the coma correction effect of the magnetic field generated by the four-pole coil when the electron beams are deflected upwards.

Note that the four-pole magnetic field generated by the four-pole coils 67 and 69 has a coma correction effect, and corrects coma aberration together with the coma correction coils 62 and 64. FIG. 15 shows the magnetic fields generated by the four-pole coils 67 and 69 when the electron beams are deflected upwards. The magnetic fields have an effect of increasing the vertical deflection angle of the electron beams R, G and B, and in particular an effect of increasing the vertical deflection angle of the center electron beam G in relation to the outer electron beams R and B. Therefore a coma correction effect is achieved.

In the same way, when the electron beams are deflected downward, the vertical deflection angle of the center electron beam G is increased compared to that of the side electron beams R and B to correct coma aberration. Consequently, the coma correction coils can be used to assist correction of YH misconvergence without loss of their coma correction function.

<Technical Significance of the Present Invention>

As has been described, the technique disclosed in the above-described laid open patent application is unable to correct YH misconvergence accurately when the high order components of YH misconvergence increases, causing residual YH winding. This technique attempts to deal with the high order components by combining diodes in stages, as shown in FIG. 4, but a large drop in the voltage of the resistors means a correction amount sufficient to resolve the YH misconvergence itself cannot be obtained.

Figure 16:
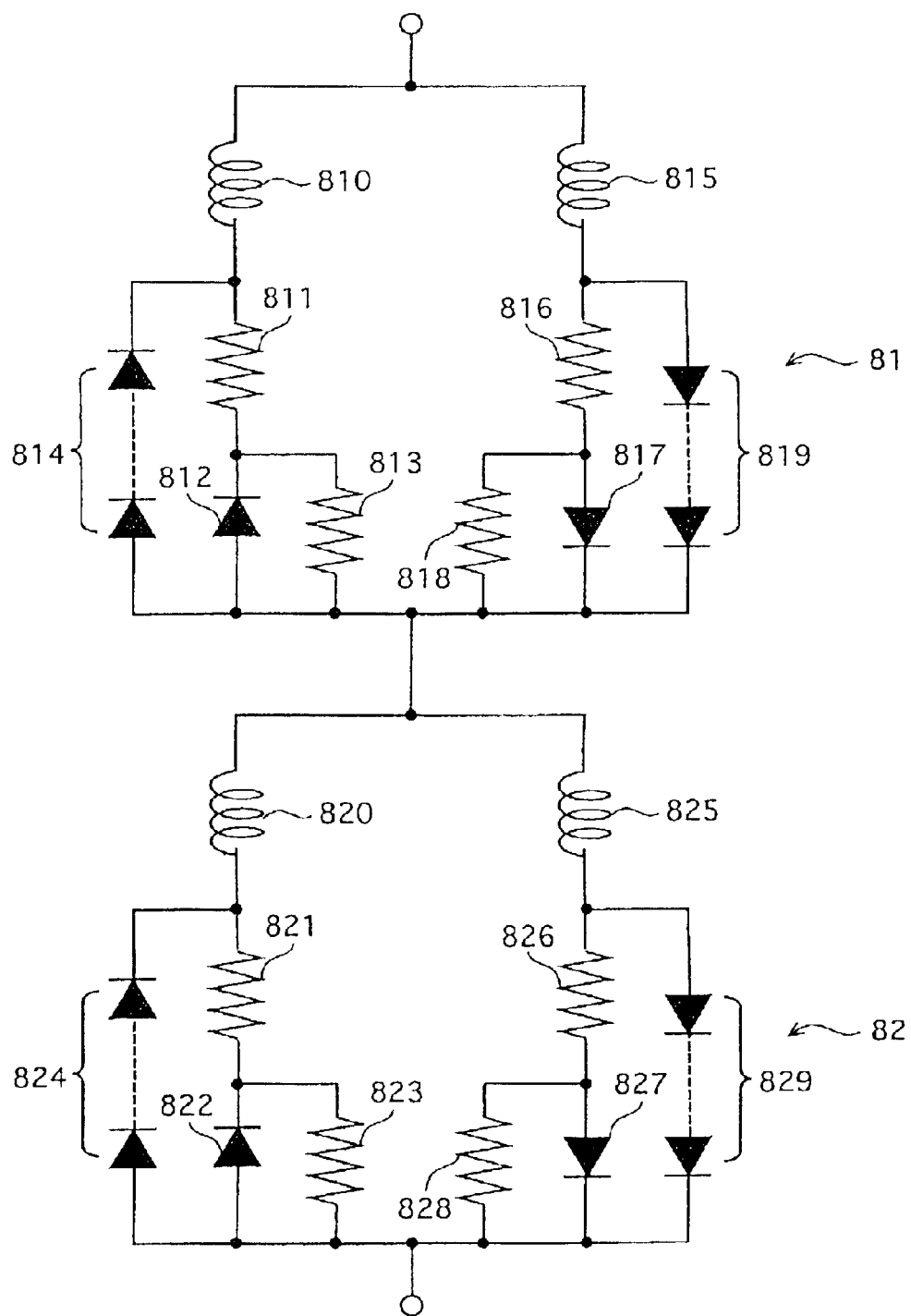
FIG. 16 shows the construction of a four-pole coil circuit that is capable of dealing with high order components of YH misconvergence, while ensuring a sufficient amount of correction.

The following structure is one possible way of solving this problem. FIG. 16 shows a circuit structure of four-pole coils that deal with the high order components of YH misconvergence while ensuring a sufficient amount of correction. FIG. 16 shows a YH correction circuit 80 in which YH correction circuits 81 and 82 are connected in serial in the same manner as in FIG. 4.

Figure 1:
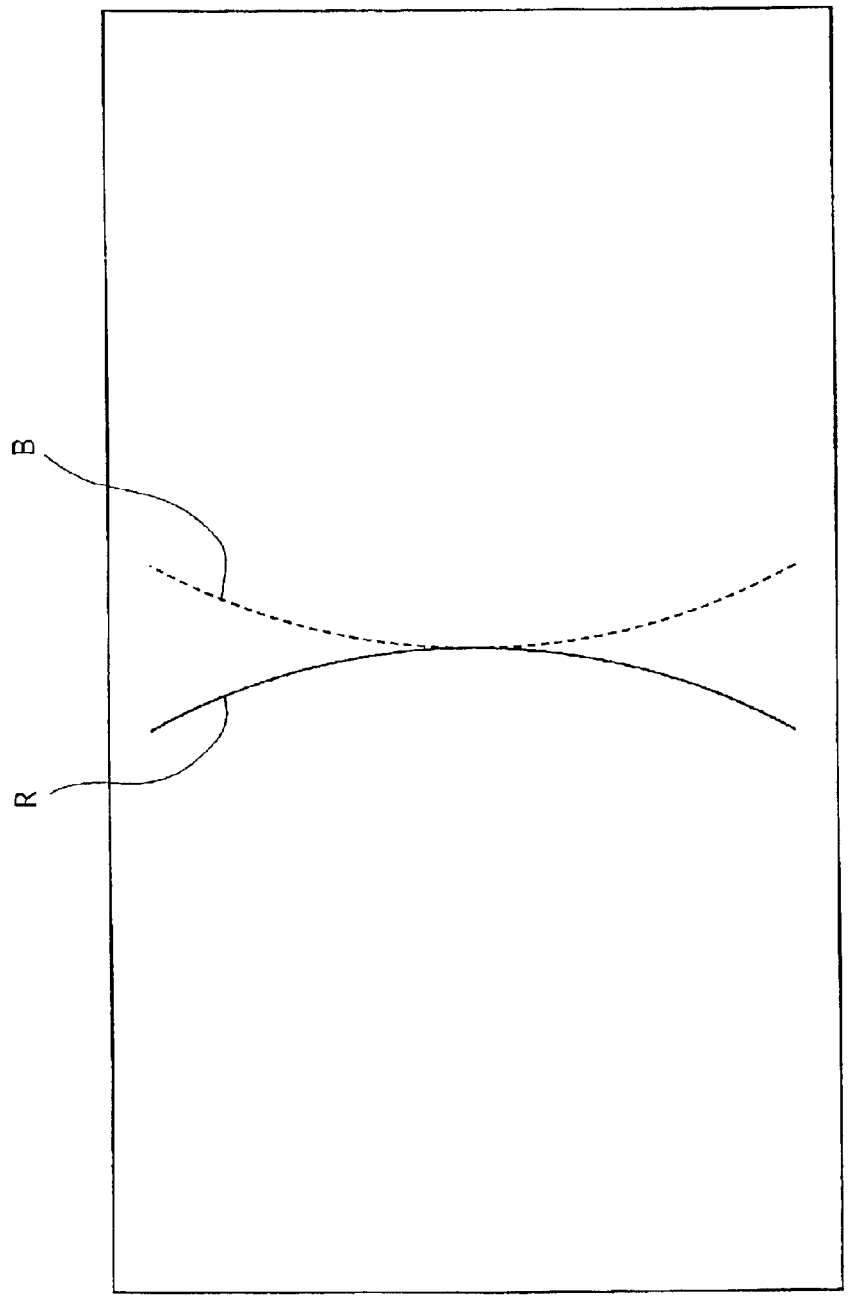
FIG. 1 shows YH misconvergence.
Figure 2:
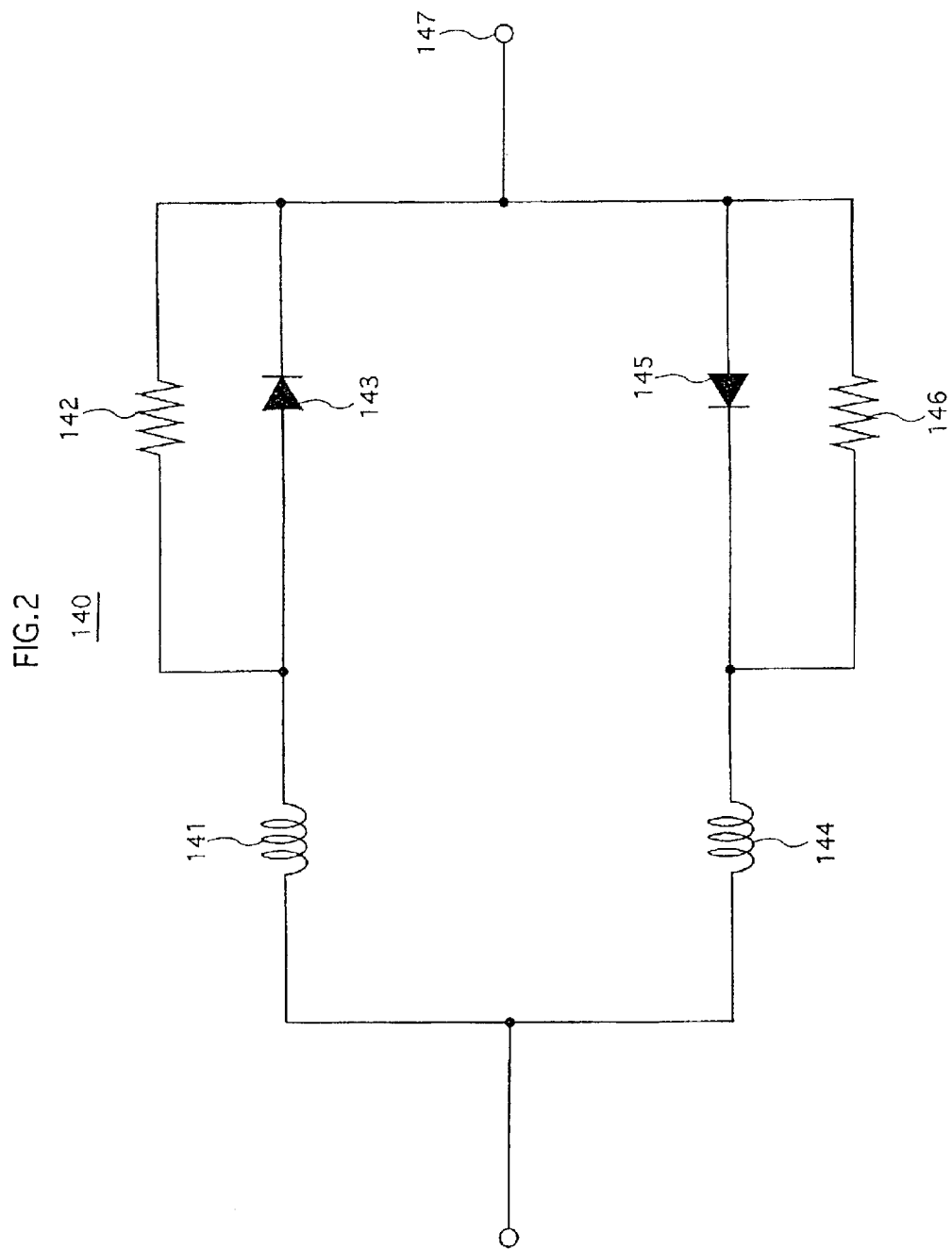
FIG. 2 shows the structure of a conventional YH correction circuit.
Figure 3:
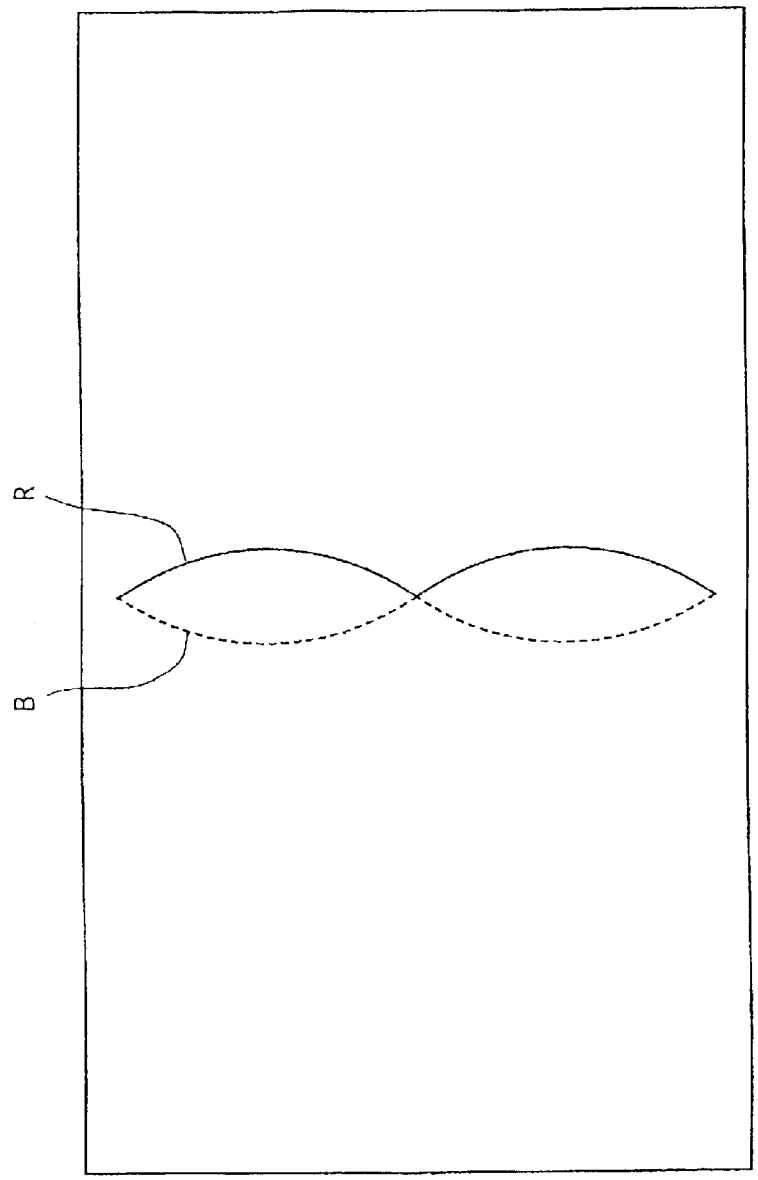
FIG. 3 shows misconvergence (YH winding) that remains after correcting YH misconvergence in the conventional YH correction coil.
Figure 4:
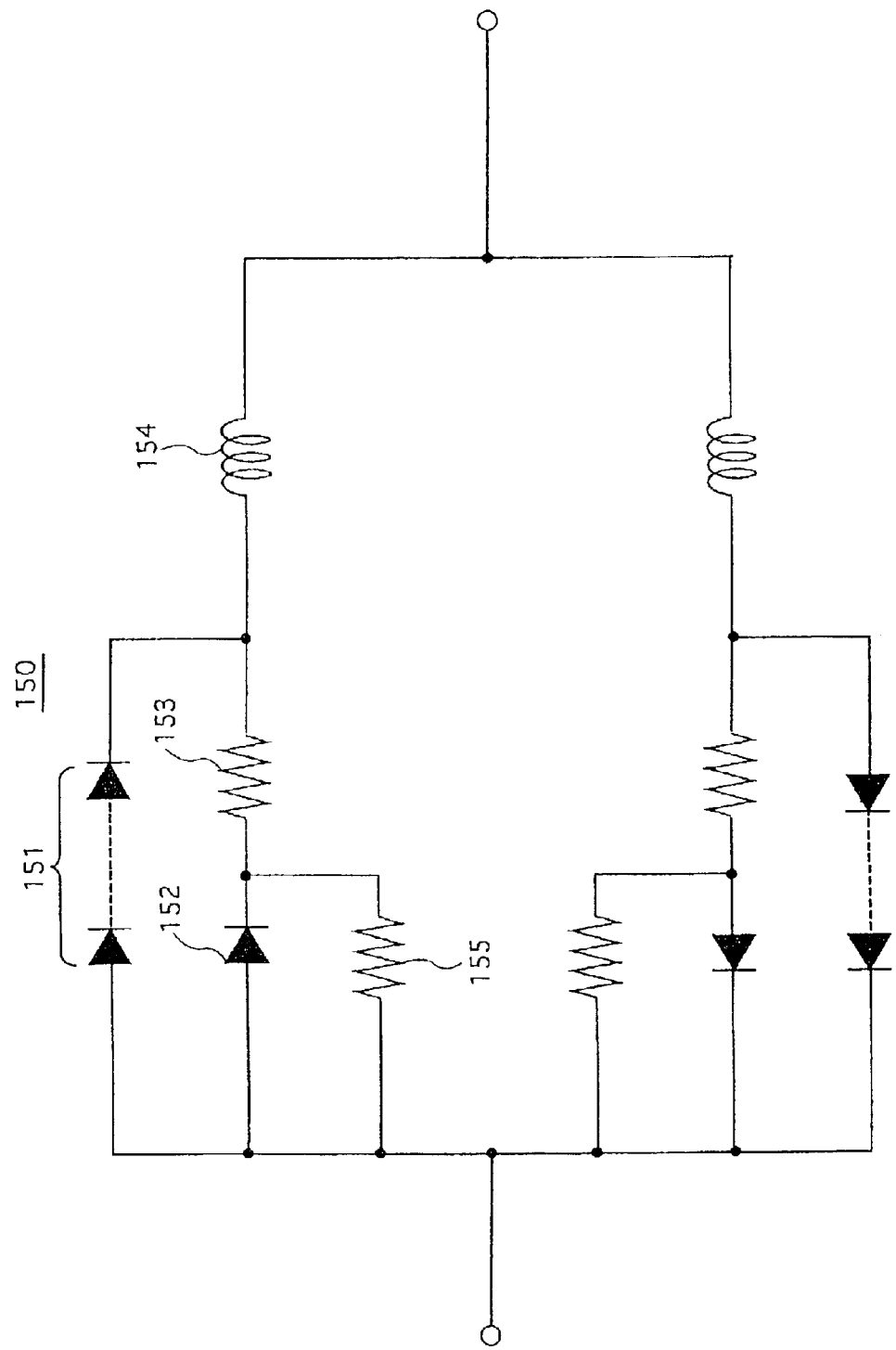
FIG. 4 is a circuit diagram showing the structure of a YH correction circuit in a convergence correction disclosed in Japanese laid open patent application number 4-298942.

The YH correction circuits 81 and 82 both have the same structure as the YH correction circuit 150 in FIG. 4. The YH correction circuits 81 and 82 correct YH misconvergence by having a four-pole magnetic field generated with a strength corresponding to the amount of diverted vertical deflection current. Furthermore, as is clear from FIG. 16, the YH correction circuits 81 and 82 always have four-pole magnetic fields having mutually the same polarity generated.

FIG. 16 is an assembly example of claims 7 to 9 of the present application. Here, a first circuit 81 and a second circuit 82 are connected in series. Described in terms of claim 7, the first circuit 81 is composed of pair of coils 810 and 815 that are positioned opposing each other in relation to the electron beams emitted by the electron gun. Similarly, the second circuit 82 is composed of a pair of coils 820 and 825 that are positioned opposing each other in relation to the electron beams emitted by the electron gun. Vertical deflection current is diverted to these coils so as to generate four-pole magnetic fields with mutually the same polarity.

Furthermore, described in terms of claim 8, in the first circuit 81 a circuit in which a first coil 810 and a first diode 812 are connected in series is connected to a circuit in which a second coil 815 and a second diode 817 are connected in series. Here, the first diode 812 and the second diode 817 conduct in mutually opposite directions.

Furthermore, in the second circuit 82 a circuit in which a third coil 820 and a third diode 822 are connected in series is connected to a circuit in which a fourth coil 825 and a fourth diode 827 are connected. Here, the third diode 822 and the fourth diode 827 conduct in mutually opposite directions. Furthermore, the vertical deflection current is diverted to the first circuit 81 and the second circuit 82 is as described earlier.

In addition, described in terms of claim 9, a circuit 814 in which a plurality of diodes that have the same conduction direction as the first diode 812 are connected in series is connected in parallel to the first diode 812. Furthermore, a circuit 819 in which a plurality of diodes that have the same conduction direction as the second diode 815 are connected in series is connected in parallel to the second diode 815.

Note that in FIG. 16, the YH correction circuit 80 is composed of two YH correction circuits 81 and 82, but the YH correction circuit 80 may be composed of three or more YH correction circuits. Furthermore, in FIG. 16, the YH correction circuits 81 and 82 have the same structure as each other, but the number of diodes in each of the two YH correction circuits may differ. The Claims should be interpreted as including such modifications.

According to such a circuit structure, not only can the high order components of YH misconvergence be dealt with, but also a sufficient correction amount can be ensured according to the combination of a plurality of YH correction circuits. On the other hand, as can be easily seen from FIG. 16, the YH correction circuit has an overly complicated structure and too may components, meaning that it is not practical.

In contrast, if a YH correction circuit that does not have a complicated structure or require an increase in the number of components can be realized, an ideal YH correction circuit can be achieved by combing that YH correction circuit with an existing YH correction circuit.

Figure 17:
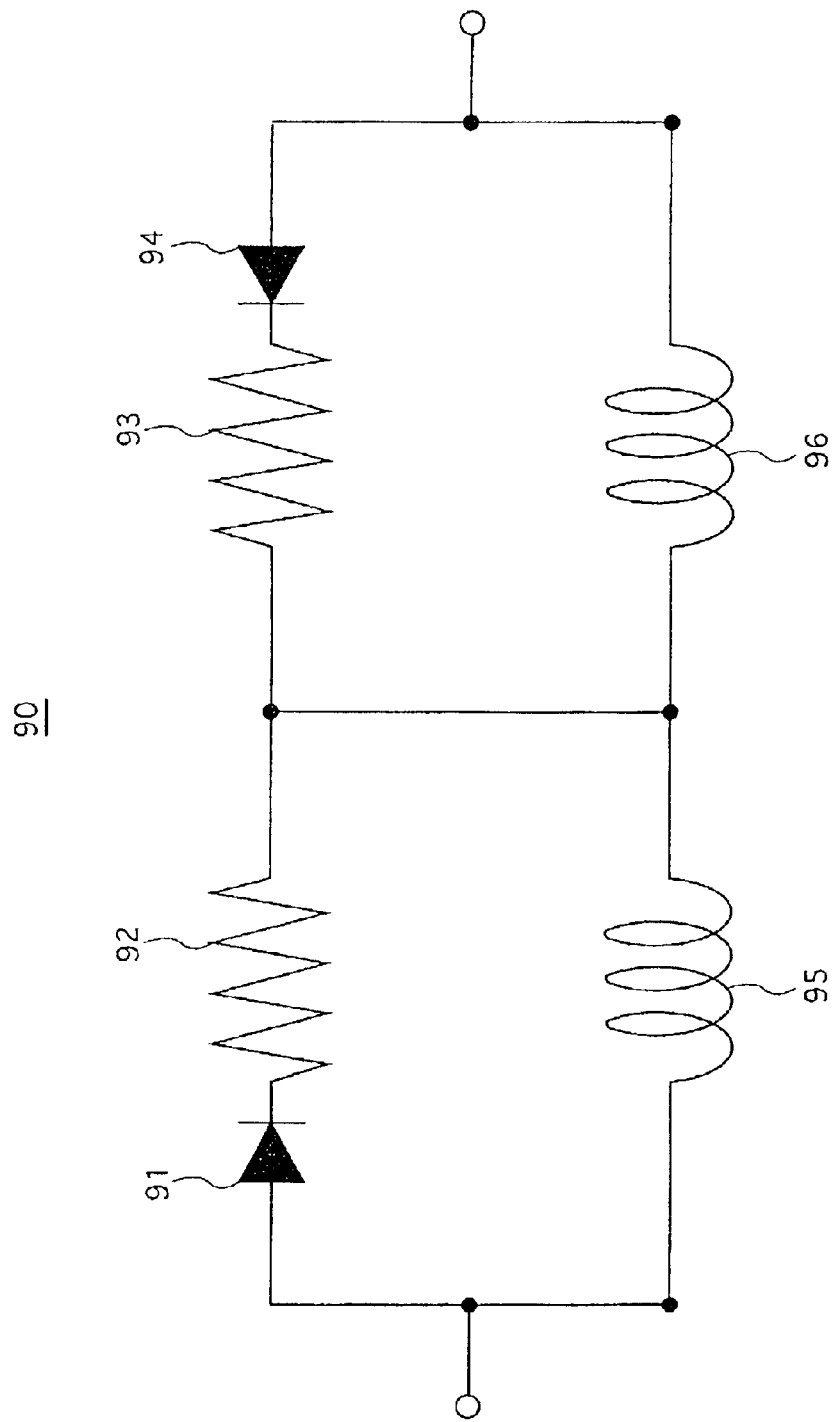
FIG. 17 is a coma aberration correction circuit that has been improved to correct YH misconvergence without making the circuit structure more complicated or increasing the number of components.

FIG. 17 is a coma aberration correction circuit modified so as to correct YH misconvergence without a complicated structure or an increase in the number of components. As shown in FIG. 17, a coma aberration correction circuit 90 is composed of two series circuits that are connected to each other in parallel. One series circuit is composed of a diode 91, resistors 92 and 93, and a diode 94 connected in series in the stated order, while the other series circuit is composed of coma correction coils 95 and 96 connected in series. Furthermore, a bridge connects two connection points in the coma aberration correction circuit 90.

Here, FIG. 17 is an example of implementation of claim 10. Described in terms of claim 10, the coma aberration correction circuit 90 is composed of an upper coma aberration coil 95 and a lower coma aberration coil 96. The upper coma aberration correction coil 95 and the lower aberration correction coil 96 are positioned in opposition to each other in relation to the electron beams.

The diode 91 functions as a switch, and is positioned so as to conduct when the upper side of the screen is being scanned. The diode 94 also functions as a switch, and is positioned so as to conduct when the lower side of the screen in being scanned.

The coma aberration coil 90 is composed of a first circuit and a second circuit that are connected in series. The first circuit is composed of a diode 91 that is a switching element and the upper coma aberration coil 95 connected in parallel. The second circuit is composed of a diode 94 that is a switching element and the lower coma aberration coil 96 connected in parallel. Vertical deflection current is diverted to the coma aberration coil 90.

In this kind of coma aberration correction circuit 90 the difference in the amount of current supplied to the coma correction coils 95 and 96 increases as the vertical deflection angle increases. Therefore, a four-pole magnetic field component is generated, thus correcting YH misconvergence. In addition, from FIG. 17 it can be seen that according to the coma aberration correction coil 90 YH misconvergence can be corrected while avoiding a complicated structure and an increase in number of components.

Furthermore, comparing FIG. 9 and FIG. 17, it is clear that the YH correction circuit of the present invention can correct YH misconvergence with even fewer components with the coma aberration correction circuit 90 in FIG. 17 compared to when the four-pole coils are connected in series. Consequently, the present invention can avoid an increase in high order components of YH convergence and ensure a sufficient amount of YR correction.

In summary, the fundamental techniques of the present invention are (1) dealing with high order components of YH misconvergence and ensuring a sufficient correction amount by combining two YH correction circuits, and (2) correcting YH misconvergence with use of the coma aberration correction circuit 90. In addition, the YH correction circuit 60, which is obtained by combining these techniques, has an effect of reducing the number of components, thus keeping cost down.

<Modifications>

The present invention has been described based on, but is not limited to, the above described embodiments. The following are examples of possible modifications.

(1) In the above-described embodiments the coma correction coil and the four-pole coil are wound around a U-shaped core, but the core may be E-shaped.

Figure 18:
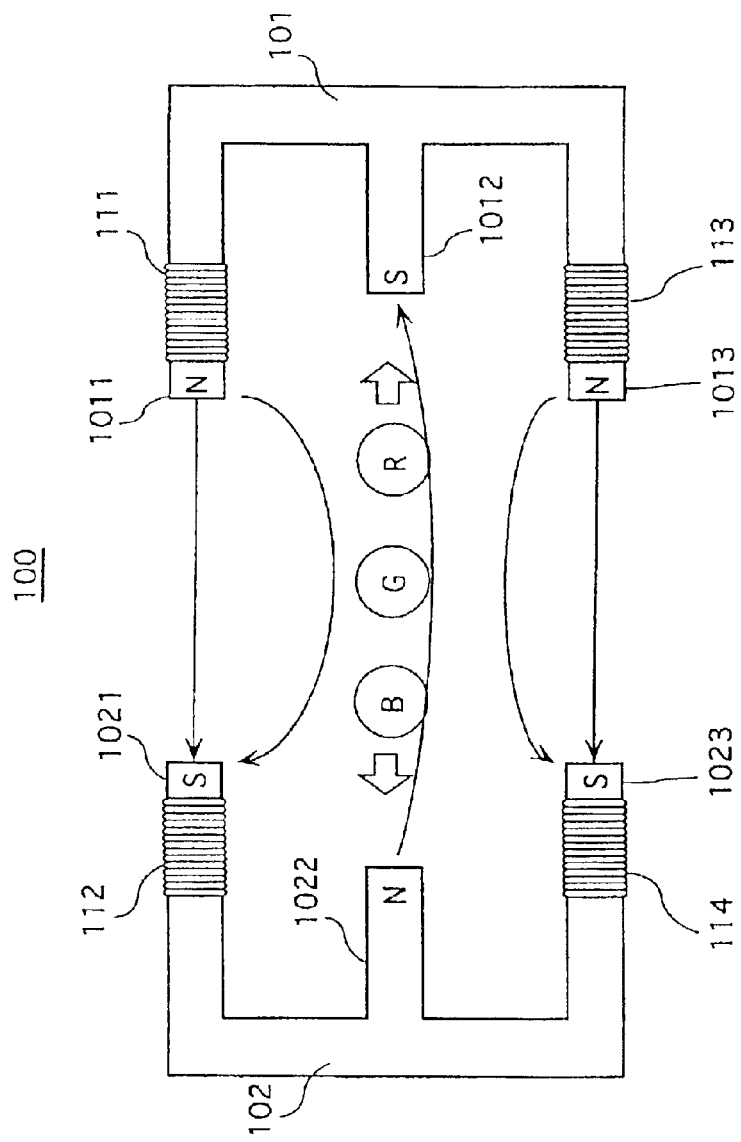
FIG. 18 shows the appearance from the screen side of the structure of correction coils that use E-shaped cores.

FIG. 18 shows the appearance from the screen side of the correction coil when an E-shaped coil is used. In FIG. 18 the four-pole coils are omitted to show the effects of the coma correction coils exclusively. A pair of E-shaped cores 100 is composed of an E-shaped core 101 on the right (E side) in the horizontal direction, and an E-shaped core 102 on the left-side (W side).

The right core 101 is composed of, in order from the upper side (N side) in the vertical direction, an upper leg 1011, a center leg 1012, and a lower leg 1013. Similarly, the left core 102 has an upper leg 1021, a center leg 1022, and a lower leg 1023. The upper legs 1011 and 1021 have coma correction coils 111 and 112 respectively wound therearound, and the lower legs 1013 and 1023 have coma correction coils 113 and 114 respectively wound therearound.

A coma correction magnetic field is generated by diverting vertical deflection current to the coma correction coils 111 to 114. FIG. 18 shows the coma correction magnetic fields generated when the electron beams are deflected upwards. The legs 1011, 1013 and 1022 are north poles, and the legs 1012, 1021 and 1023 are south poles. Magnetic fields are generated such as shown by the solid line arrows in FIG. 18.

Here, the electron beams R and B are affected by the vertical component of the magnetic fields in a manner shown by arrows having a solid outline. YH misconvergence is corrected by these effects.

Figure 19:
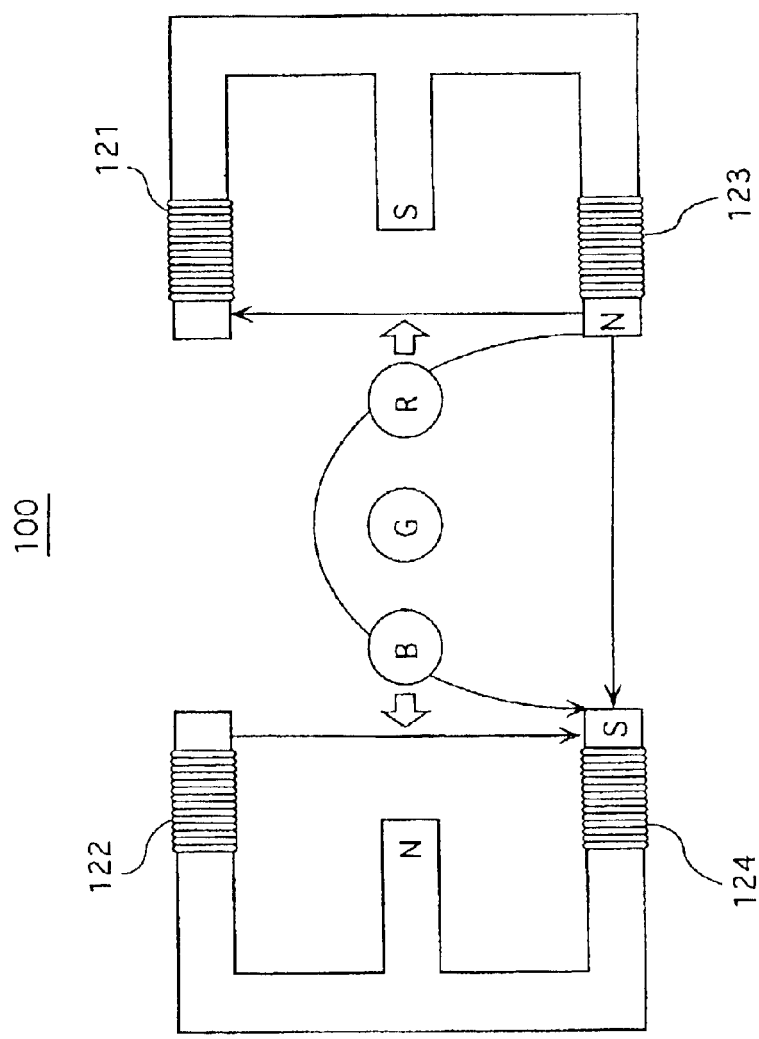
FIG. 19 shows the appearance of the structure of the E-shaped cores with a focus on the four-pole coils, as seen from the screen side.

Furthermore, FIG. 19 shows the structure of the pair of E-shaped cores 100 particularly focusing on the four-pole coils, as seen from the screen side in the same way as FIG. 18. The upper legs 1011 and 1021 have four-pole coils 121 and 121 respectively wound therearound, and the lower legs 1013 and 1023 have four-pole coils 123 and 124 respectively wound therearound.

When the electron beams are deflected upwards, the vertical deflection current is diverted only to the four-pole coils 123 and 124, and magnetic fields are generated, as shown by the solid line arrows, so that the lower legs 1013 and 1023 are north and south poles respectively, and the center legs 1012 and 1022 are south and north poles respectively. The electron beams R and B are effected by the vertical component of the magnetic fields as shown by arrows having a solid outline, thus correcting YH misconvergence.

Note that when a coma correction coil and a four-pole coil are wound around the same leg of the E-shaped core, the coils may be wound together in the same position or in different positions.

Figure 20:
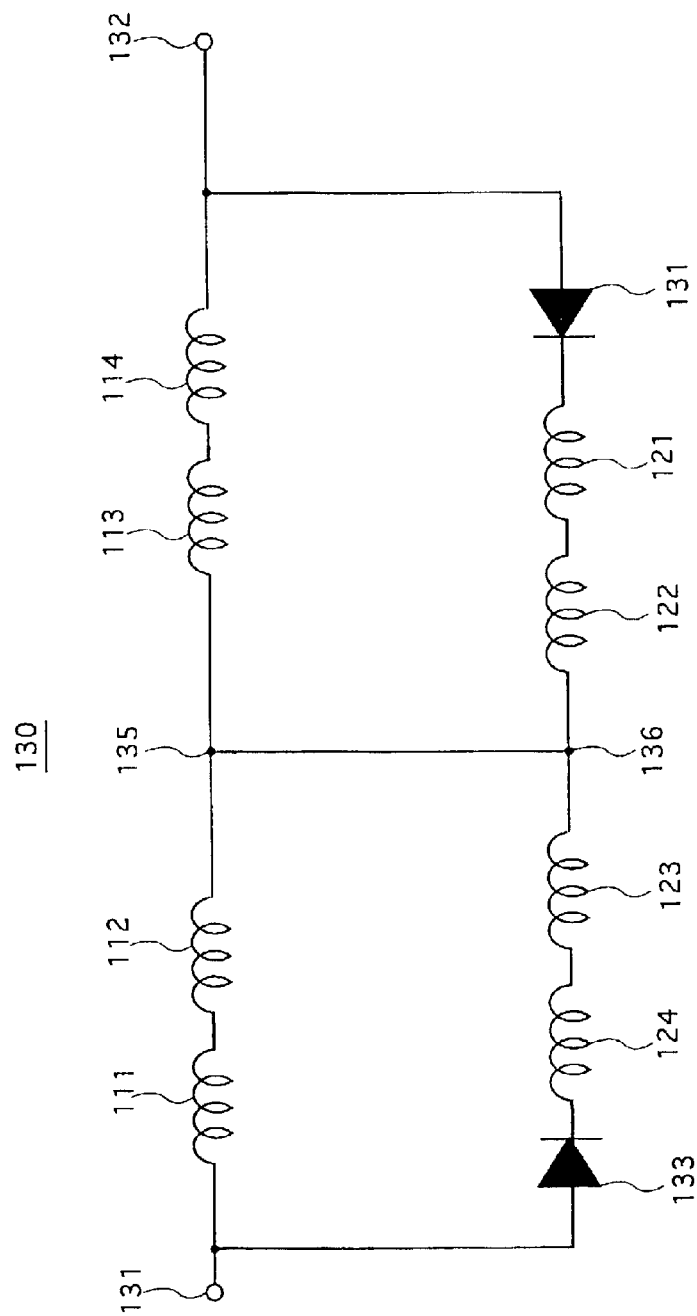
FIG. 20 shows the structure of a YH correction circuit composed of coma correction coils and four-pole coils wound around E-shaped cores.

FIG. 20 shows the structure of the YH correction circuit when coma correction coils and four-pole coils are wound around the pair of E-shaped cores 100. A YH correction circuit 130 shown in FIG. 20 has approximately the same circuit structure as the YH correction circuit 60. A circuit in which YH correction coils 111 to 114 are connected in series is connected in parallel to a circuit in which four-pole coils 121 to 124 are sandwiched by diodes 133 and 134.

The YH correction coil 130 further includes connection points 135 and 136 that are connected by a bridge. The YH correction coil 130 also has terminals 131 and 132 to which vertical deflection current is diverted.

As has been described, the effects of the present invention can also be achieved by using E-shaped cores. Furthermore, other structures that are possible are one in which a pair of E-shaped cores are positioned respectively above and below the electron beams (N and S sides), or one in which a pair of U-shaped cores are positioned respectively left and right (E and W sides) of the electron beams. However, the energy efficiency in such structures is poor, meaning that they are not realistic from a cost point of view.

In this sense, it is preferable to employ a U-shaped core as described in the embodiments. Furthermore, the structure in which E-shaped coils are positioned on the left and right of the electron beams is the next most desirable, although the extra coils are slightly disadvantageous from a cost point of view.

(2) In the embodiments a perpendicular direction is called the vertical direction and a direction that intersects the vertical direction orthogonally is called the horizontal direction. However, the effect of the present invention can be obtained even if the perpendicular direction is called the horizontal direction, and the direction that intersects with the horizontal direction orthogonally is called the vertical direction. In other words, it is possible to call the direction in which the three electron beams are arranged in line the horizontal direction, and call the direction that intersects with the horizontal direction orthogonally the vertical direction. In keeping with this, the upper side may refer to either of the sides in the vertical direction, and the lower side to the other side. The Claims should also be interpreted in this way.

(3) In the embodiments vertical deflection current is diverted to the coma correction coils and the four-pole coils, however if a current that fluctuates in sync with the size of the vertical deflection current is used, it is not necessary to divert the current.

Furthermore, although diodes are used as switching elements in the embodiments, switching elements other than diodes may be used.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A color picture tube composed of an electron gun that includes three inline cathodes, comprising:
   an upper YH misconvergence correction coil;
   a lower YH misconvergence correction coil that is provided in opposition to the upper YH misconvergence correction coil with regard to electron beams emitted from the electron gun;
   an upper coma aberration correction coil that is provided on the same side as the upper YH misconvergence correction coil with regard to the electron beam;
   a lower coma aberration correction coil that is provided in a position that opposes the upper coma aberration correction coil with regard to the electron beams;
   a first switching element that is connected to a circuit so as to conduct when the electron beams scan an upper side of a screen;
   a second switching element that is connected to a circuit so as to conduct when the electron beams scan a lower side of the screen;
   a YH misconvergence correction circuit composed of (1) a first circuit in which a circuit composed of the lower YH misconvergence correction coil and the first switching element connected in series is connected in parallel to the upper coma aberration correction coil, and (2) a second circuit in which a circuit composed of the upper YH misconvergence correction coil and the second switching element are connected in series is connected in parallel to the lower coma aberration correction coil, the first circuit and the second circuit being connected in series,
   wherein vertical deflection current is diverted to the YH misconvergence correction circuit.

2. The color picture tube of claim 1,
   wherein the first switching element and the second switching element are diodes.

3. A color picture tube composed of an electron gun that includes three inline cathodes, comprising:
   a first circuit that is composed of (1) a circuit in which a first coil and a first diode are connected in series connected in parallel to (2) a circuit in which a second coil that is positioned in opposition to the first coil with regard to electron beams emitted by an electron gun is connected in series to a second diode, the first diode and the second diode conducting in mutually opposite directions;
   a second circuit that is connected in series to the first circuit, and is composed of (3) a circuit in which a third coil and a third diode are connected in series connected in parallel to (4) a circuit in which a fourth coil that is positioned in opposition to the third coil with regard to the electron beams is connected in series to a fourth diode, the third diode and the fourth diode conducting in mutually opposite directions,
   wherein vertical deflection current is diverted to the first circuit and the second circuit.

4. The color picture tube of claim 3, wherein
   a circuit composed of a plurality of diodes that conduct in the same conduction direction as the first diode and that are connected in series is connected in parallel to the first diode, and
   a circuit composed of a plurality of diodes that conduct in the same conduction direction as the second diode and that are connected in series is connected in parallel to the second diode, the number of the plurality of diodes that conduct in the same direction as the second diode being equal to the number of the plurality of diodes that conduct in the same direction as the first diode.

5. A color picture tube composed of an electron gun that includes three inline cathodes, comprising:

an upper coma aberration correction coil;

a lower coma aberration correction coil that is positioned in opposition to the upper coma aberration correction coil with respect to electron beams emitted by the electron gun;

a first switching element that is positioned so as to conduct when an upper side of a screen is being scanned;

a second switching element that is positioned so as to conduct when a lower side of the screen is being scanned; and a YH misconvergence correction circuit composed of (1) a first circuit in which the first switching element and the upper coma aberration correction coil are connected in parallel, and (2) a second circuit in which the second switching element and the lower coma aberration correction coil are connected in parallel, the first circuit and the second circuit being connected in series, wherein vertical deflection current is diverted to the YH misconvergence correction circuit.

\* \* \* \* \*